(12) United States Patent
Hewitt et al.

(10) Patent No.: US 11,548,570 B2
(45) Date of Patent: Jan. 10, 2023

(54) TWO PANEL CAB BACK IN UNIBODY PICK-UP TRUCK

(71) Applicant: Ford Global Technologies, LLC, Dearborn, MI (US)

(72) Inventors: Daniel Hewitt, Amherstburg (CA); Vincent Anthony Chimento, Plymouth, MI (US); Satish Ganti, Canton, MI (US); Adam Hanes, South Rockwood, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 17/141,099

(22) Filed: Jan. 4, 2021

(65) Prior Publication Data

US 2022/0212726 A1 Jul. 7, 2022

(51) Int. Cl.
*B62D 33/023* (2006.01)

(52) U.S. Cl.
CPC ................................ *B62D 33/023* (2013.01)

(58) Field of Classification Search
CPC ............................ B62D 33/023; B62D 33/02
See application file for complete search history.

(56) References Cited

U.S. PATENT DOCUMENTS

| 4,480,868 | A | 11/1984 | Koto |
| 6,814,398 | B2 | 11/2004 | Hashimoto |
| 7,766,416 | B2 | 8/2010 | McClure et al. |
| 11,279,421 | B1 * | 3/2022 | Hoogendoorn ............ B60R 9/06 |
| 2004/0232722 | A1 * | 11/2004 | Kharod .................... B60P 3/423 296/146.4 |
| 2006/0108831 | A1 * | 5/2006 | McClure ................ B62D 33/00 296/182.1 |
| 2008/0258488 | A1 * | 10/2008 | Philip .................... B60R 13/011 296/39.1 |
| 2009/0039675 | A1 * | 2/2009 | King ........................ B60P 3/423 296/182.1 |
| 2018/0170295 | A1 * | 6/2018 | Edwards ................. B60R 13/01 |
| 2018/0264988 | A1 * | 9/2018 | Johnson ................ B60P 7/0892 |
| 2018/0355948 | A1 * | 12/2018 | Malone .................... F16F 15/02 |
| 2021/0245819 | A1 * | 8/2021 | Simonin ................ B62D 33/02 |
| 2021/0403096 | A1 * | 12/2021 | Higgins ................. B62D 29/043 |
| 2022/0017154 | A1 * | 1/2022 | Hewitt .................... B62D 25/04 |
| 2022/0055697 | A1 * | 2/2022 | Morgans .............. B62D 27/023 |
| 2022/0097778 | A1 * | 3/2022 | Syed .................. B62D 25/2054 |

FOREIGN PATENT DOCUMENTS

WO WO-9903718 A1 * 1/1999 ................ B60P 3/40

* cited by examiner

*Primary Examiner* — D Glenn Dayoan
*Assistant Examiner* — Kevin P Weldon
(74) *Attorney, Agent, or Firm* — Vichit Chea; Carlson, Gaskey & Olds, P.C.

(57) ABSTRACT

The present disclosure relates to a truck that includes a first wheel well and a second wheel well. A bed is positioned between the first wheel well and the second wheel well. In addition, the truck includes a two-piece cab back panel that is formed of a lower cab back panel and an upper cab back panel. The lower cab back panel is arranged adjacent to the bed and between the first wheel well and the second wheel well while the upper back panel is separated from the bed by the lower cab back panel.

13 Claims, 4 Drawing Sheets

TWO PANEL CAB BACK IN UNIBODY PICK-UP TRUCK

BACKGROUND

Technical Field

The present disclosure relates to a cab back panel of a truck.

Description of the Related Art

Pick-up trucks have a cab and a separate cargo section. Pick-up trucks generally have a body on frame chassis in which the cab and the cargo section are mounted. Some pick-up trucks are manufactured as a unibody, such that the cab and the cargo section are a single unit.

BRIEF SUMMARY

The present disclosure relates to aspects of simplifying the manufacturing of a unibody truck. The truck includes a two-piece cab back panel that separates a cab from a cargo section. The cab back includes a first panel and a second panel that is between the first panel and a bed of the truck. The second or lower cab back panel is adjacent to or otherwise abutting the bed and is between a first wheel well and a second wheel well.

The first or upper cab back panel can include a lower extension that is configured to couple to the second cab back panel. The second, lower cab back panel can include an upper portion and a lower portion. The upper portion is coupled to the lower extension of the first panel. The lower portion of the second portion includes a first indentation on a first lower side and a second indentation on a second lower side opposite to the first side. The first and second indentations are configured to accommodate additional components that will pass through or integrate with the cab back and the bed of the truck. The second panel's top edge is wider than the second panel's bottom edge.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with trucks have not been shown or described in detail to avoid unnecessarily obscuring descriptions of the embodiments.

Figure 1A:
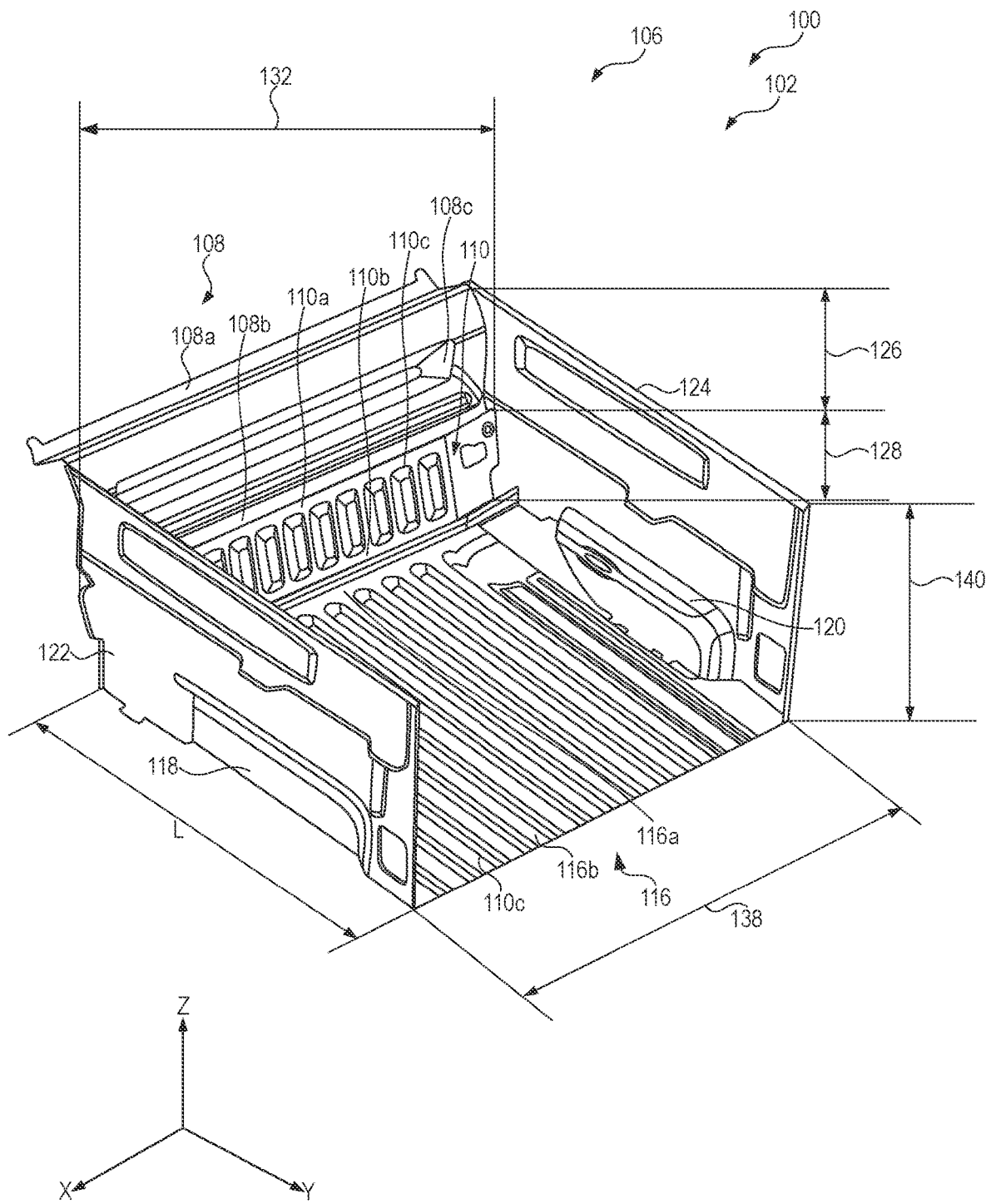
FIG. 1A shows a perspective view of a chassis of a truck according to one embodiment of the present disclosure.
Figure 1B:
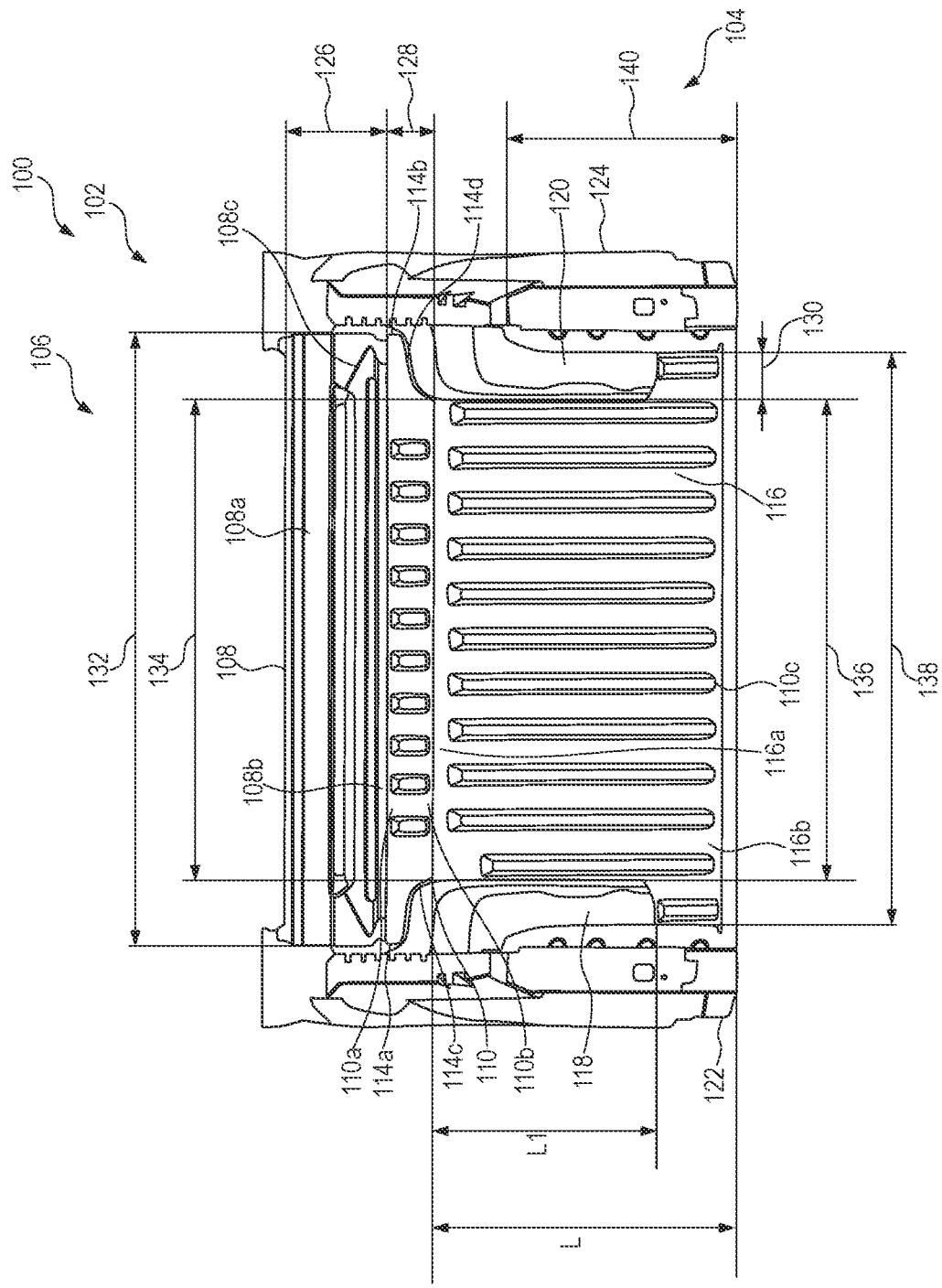
FIG. 1B shows a rear view of the chassis of FIG. 1A.

FIGS. 1A and 1B show different views of a bed section 102 of a truck 100. Specifically, FIG. 1A is a perspective view of the bed section 102 and FIG. 1B is a rear view of the bed section 102. The bed section 102 is part of a unibody truck.

A cab back 106 separates the cab from a cargo section 104. The cab back 106 forms an interior wall of the bed and includes aesthetic features.

The cab back 106 includes a first, upper panel 108 and a second, lower panel 110. The upper cab back panel 108 is below and adjacent to a rear window of the cab, such that the first panel 108 is between the window and the second panel 110. The upper cab back panel 108 and the lower cab back panel 110 are configured to be installed separately during assembly of the unibody truck. The upper cab back panel 108 and the lower cab back panel 110 have smaller dimensions and weigh less than a conventional single-piece cab back panel. These smaller dimensions allow easier maneuvering of each of the panels and provides easier access to welding and fastener locations with standard sized tools. The upper cab back panel 108 and the lower cab back panel 110, may be installed from inside the cab or unibody.

Figure 2:
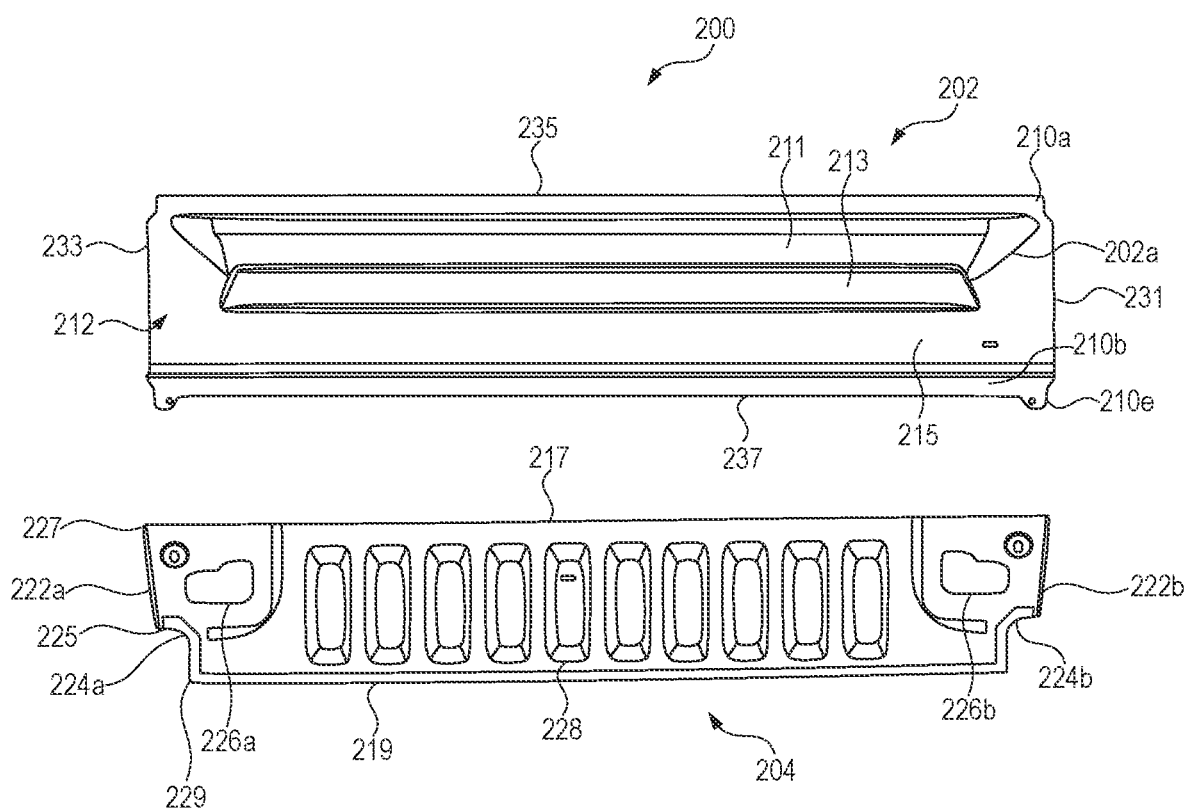
FIG. 2 shows an exploded view of an upper cab back panel of a truck according to one embodiment of the present disclosure.

The upper cab back panel 108 has a first portion 108a and a second portion 108b that together defines a height 126. The upper cab back panel 108 can have contours and profiles on an outer surface of the upper cab back panel 108 and between the first portion 108a and the second portion 108b that are aesthetic. One of the exemplary profiles is shown in FIGS. 1A and 1B while another exemplary profile is shown in FIG. 2.

The upper cab back panel 108 includes horizontal profiles 108c that run along a length of the upper cab back panel 108, from a passenger side to a driver's side. The horizontal profiles 108c may also impart structural rigidity to the upper cab back panel 108.

The upper panel 108 is coupled to the lower panel 110 with extensions that protrude from a lower edge of the upper panel 108. The extensions include holes or other coupling surfaces to allow a weld or fastener to be inserted during assembly.

The lower cab back panel 110 includes an upper portion 110a and a lower portion 110b that together define a height 128 of the lower cab back panel 110. The upper portion 110a is coupled to the lower extensions of the upper cab back panel 108, for example, by fasteners. Alternately, the upper portion 110a is coupled to the upper cab back panel 108 by welding or riveting. In either case, the upper portion 110a and the upper cab back panel 108 are attached in such a way that the upper cab back panel 108 and the lower cab back panel 110 are a single cab back unit when assembled.

The lower cab back panel 110 also includes a plurality of ribs 110c, extending along the upper portion 110a and the lower portion 110b from the passenger side to the driver side. The plurality of ribs 110c are aesthetic and provide structural rigidity to the lower cab back panel 110. The lower cab back panel 110 includes a first extension 114a and a second extension 114b, in FIG. 1B, that define side ends of the upper portion 110a of the lower cab back panel 110. The first extension 114a is on the driver side of the truck and the second extension 114b is on the passenger side of the truck.

The lower cab back panel 110 includes a first indentation 114c and a second indentation 114d that define edges of the lower portion 110b. The first indentation 114c has a curved shape profile that extends from underneath the first extension 114a toward the bed. Similarly, the second indentation 114d has a curved profile that corresponds the first indentation 114c and extends from underneath the second extension 114b toward the bed. A width (dimension 132) of the lower cab back panel 110 between the first extension 114a and the second extension 114b is greater than a width (dimension 134) between the first indentation 114c and the second indentation 114d.

The cargo section 104 includes a bed 116 that forms a floor. The bed 116 extends along a first length L of the cargo section 104 and includes a first portion 116a and a second portion 116b. The first portion 116a is coupled to the lower portion 110b of the lower cab back panel 110 while the second portion 116b is configured to couple to a tailgate. The width of the bed 116 at the first portion 116a, which correspondence to the first and second indentations of the lower panel is less than the width of the bed 116 at the second portion 116b, i.e. at a rear end of the truck.

The truck 100 includes a first wheel well 118 and a second wheel well 120 on either side of the bed 116. The first wheel well 118 and the second wheel well 120 are coupled to the first and second indentations at the lower portion 110b of the lower panel. The curves of the first and second indentations correspondence to curves of the wheel wells. The first extension 114a of the lower panel is between the first wheel well 118 and the upper cab back panel 108 and the second extension 114b is between the second wheel well 120 and the upper cab back panel 108. The first indentation 114c is attached to the first wheel well 118 and the second indentation 114d is attached to the second wheel well 120. In an example, each of the first wheel well 118 and the second wheel well 120 has a second length L1 and extends along a portion of the first length L of the bed 116.

The cargo section 104 is also formed by side panels, namely a first side panel 122 and a second side panel 124. The first side panel 122 and the second side panel 124 are placed on either side of the bed 116 and have a length equal to the second length L1 of the bed 116. In addition, the first side panel 122 and the second side panel 124 have a height 140 that also defines the height of the cargo section 104. The upper cab back panel 108 and the lower cab back panel 110 extend between the first side panel 122 and the second side panel 124.

Dimensions of the cab back 106 and the bed 116 are determined by various parameters, such as overall width and length of the cab, or a cargo-carrying capacity of the cargo section 104. In one example, the cab back 106 has a first dimension 132, along an X-axis, that can be substantially equal to the width of the bed. Similarly, the second portion 108b and the upper portion 110a of the lower panel are substantially the same dimension as the first dimension 132 along the X-axis. In addition, the lower portion 110b has a second dimension 134 along the X-axis, such that the second dimension 134 is less than the first dimension 132.

On the other hand, the first portion 116a of the bed 116 has a first dimension 136 and the second portion 116b has a second dimension 138 that is greater than the first dimension 136. The lower portion 110b of the lower panel that is coupled to the bed has the dimension 134. The upper portion 110a of the lower panel that is coupled to the upper panel has the dimension 132.

Figure 3:
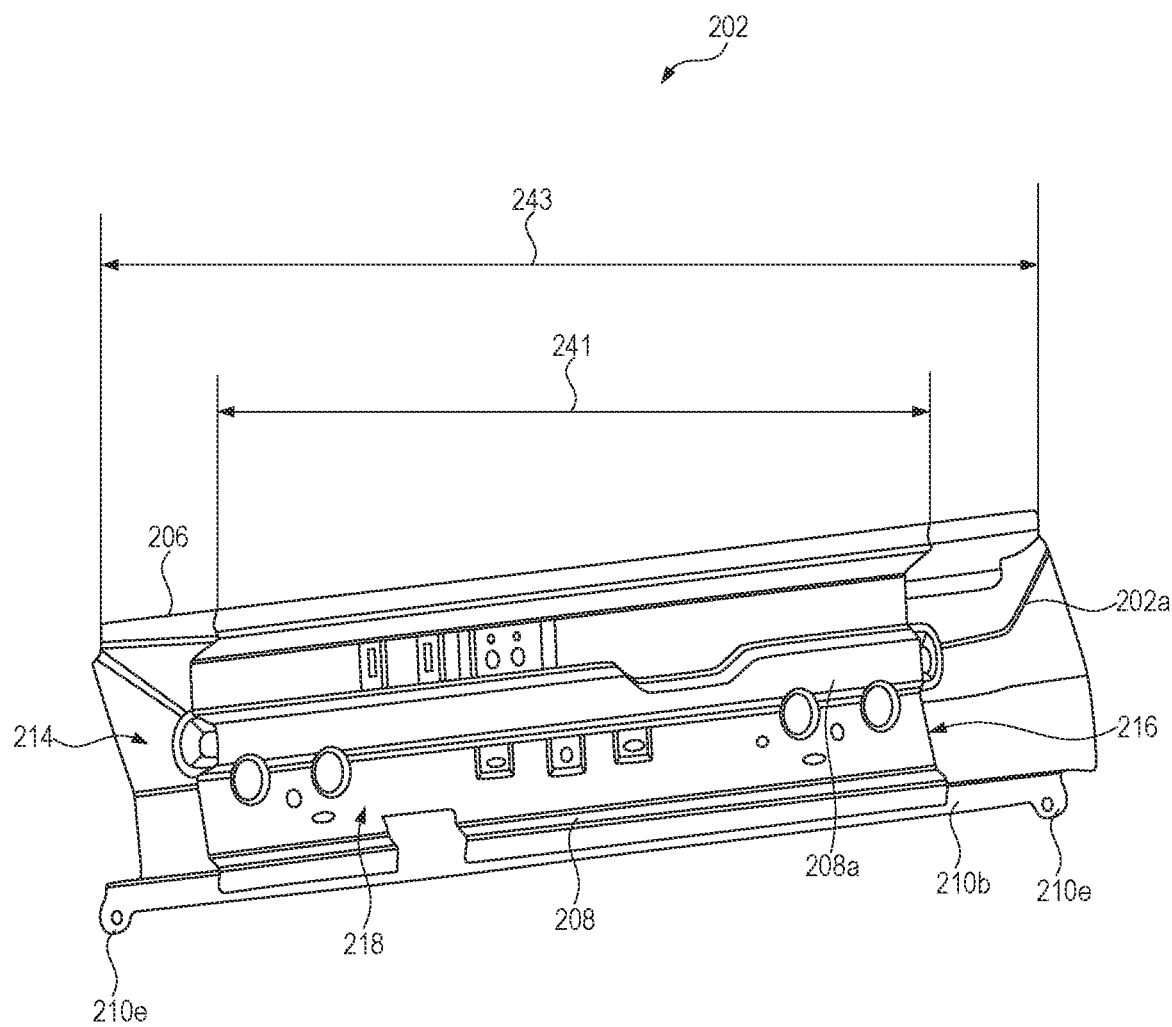
FIG. 3 illustrates a perspective view of the upper cab back panel of FIG. 2.

FIGS. 2 and 3 illustrate an alternative cab back 200. Specifically, FIG. 2 is an exploded view of an upper cab back panel 202 and a lower panel 204. FIG. 3 is a rear perspective view of the upper cab back panel 202 showing the inner panel 208 in more detail. The inner panel 208 faces a cab and the outer panel 206 faces a cargo section. The outer panel 206 includes an outer surface 212 that faces the cargo section and an inner surface 214 that faces and may abut, in some locations, the inner panel 208.

A first and second flange 210a and 210b extend from a top side and a bottom side of the outer panel 206. A first inclined section 211 extends between the first flange and the second flange. A second section 213 extends from the inclined section toward the second flange. The sections 211 and 213 may form a protrusion or indentation that may be aesthetic or structural. A third section 215 extends between the second section and the second flange 210b. The third section is transverse to the second section. In some embodiments, the third section is substantially perpendicular to a plan of the bed of the truck.

The outer panel 206 includes lower extensions 210e that extends from the flange 210b and is configured to couple the upper cab back panel 202 with the lower cab back panel 204. The outer panel 206 also includes horizontal profiles 202a that may be aesthetic in nature.

The inner panel 208 has a first surface 216 that faces the inner surface 214 when assembled, and a second surface 218 that faces towards the cab. The second surface 218 includes a projection or protrusion 208a that, when assembled, aligns with the second section 213 at the inner surface 214 of the outer panel. The outer panel 206 and the inner panel 208 can be joined together by a variety of manufacturing processes, such as welding or riveting. The outer panel 206 and the inner panel 208 can also be manufactured as a single unit by stamping two metal sheets together. In either case, the outer panel 206 and the inner panel 208 are integrated to form the upper cab back panel 202.

A first side 231 is opposite to a second side 233 of the upper panel. The first and second sides are transverse to an upper edge 235 and a lower edge 237. In one embodiment, the first and second sides are in the range of 85 and 95 degrees with respect to the upper edge. The sections 211 and 213 are spaced from the first side and the second side by a distance.

The inner panel 208 has a first dimension 241 along the upper edge. The outer panel 206 has a second dimension 243 along the upper edge that is greater than the first dimension 241.

The lower cab back panel 204 may be a single continuous stamped material, such as sheet metal. The lower cab back panel includes an upper edge 217 that is substantially planar. A lower edge 219 is opposite to the upper edge 217 and is smaller than the upper edge 217. The lower edge 219 includes a first curved end 224a and a second curved end 224b. The first curved end 224a extends from the lower edge 219 to a first sidewall or edge 222a. The second curved end 224b extends from the lower edge 219 to a second sidewall or edge 222b. Each of the first and second sidewalls extend from the respective curved edge to the upper edge 217. In this embodiment, the first and second sidewalls are each at an angle with respect to the upper edge that is less than 90 degrees, such that a location 225 where the first sidewall meets the first curved edged is positioned closer to a center of the panel than a location 227 where the first sidewall meets the upper edge. A location 229 where the first curved edge meets the lower edge is closer to the center of the panel than the location 225.

The first and second curved ends form indentations or recesses in each of the passenger and driver sides of the lower panel. The lower cab back panel 204 also includes one or more openings 226a, 226b that are configured to support electrical wires or hoses that couple components from the cab side to the bed side of the truck. These openings may be covered by the wheel wells or other bed features when assembled.

The lower cab back panel 204 also includes a plurality of vertically oriented ribs 228 that extends along a width of the lower cab back panel 204. The plurality of ribs 228 is formed as rectangular projections.

The various embodiments described above can be combined to provide further embodiments. All of the U.S. patents, U.S. patent application publications, U.S. patent applications, foreign patents, foreign patent applications, and non-patent publications referred to in this specification and/or listed in the Application Data Sheet, including but not limited to [insert list], are incorporated herein by reference, in their entirety. Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A vehicle, comprising:
a cab including a window;
a bed;
a cab back coupled to the bed, the cab back including:
   a first panel; and
   a second panel that is between the first panel and the bed, the first panel between the window and the second panel,
   wherein the cab back has a first dimension in a first direction, the second panel includes a first portion that has the first dimension and a second portion that has a second dimension that is less than the first dimension.

2. The vehicle of claim 1 wherein the first panel has the first dimension and the bed includes a first portion that is coupled to the second portion of the second panel, the first portion of the bed having the second dimension.

3. The vehicle of claim 1, further comprising a first wheel well and a second wheel well, a first portion of the bed is between the first wheel well and the second wheel well.

4. The vehicle of claim 3, further comprising a first side panel and a second side panel, the first portion of the bed has a first dimension in a first direction and a second portion of the bed includes a second dimension in the first direction, the second dimension being greater than the first dimension, the second portion of the bed extends between the first side panel and the second side panel.

5. The vehicle of claim 4 wherein the second panel of the cab back includes a lower portion coupled to the first portion of the bed and an upper portion that couples to the first panel.

6. The vehicle of claim 5 wherein the lower portion of the second panel has a third dimension in the first direction and the upper portion has a fourth dimension in the first direction, the third dimension being smaller than the fourth dimension.

7. A vehicle, comprising:
a first wheel well;
a second wheel well;
a bed floor positioned between the first wheel well and the second wheel well;
a lower cab back panel adjacent to the bed floor and between the first wheel well and the second wheel well;
an upper cab back panel separated from the bed floor by the lower cab back panel
a first side panel; and
a second side panel, the upper and lower cab back panels extending between the first and second side panels,
wherein the first side panel includes a first wheel well adjacent to the lower cab back panel and the second side panel includes a second wheel well adjacent to the lower cab back panel,
wherein the lower cab back panel includes a first indentation adjacent to the first wheel well and a second indentation adjacent to the second wheel well.

8. The vehicle of claim 7 wherein the lower cab back panel includes a first extension positioned between the first wheel well and the upper cab back panel and a second extension positioned between the second wheel well and the upper cab back panel.

9. A vehicle, comprising:
an upper cab back panel having a lower extension;
a lower cab back panel including:
   an upper portion coupled to the lower extension of the upper cab back panel; and
   a lower portion that includes a first indentation along a first side and a second indentation along a second side that is opposite to the first side; and
a window of a cab, wherein the upper cab back panel is between the window and the lower cab back panel.

10. The vehicle of claim 9 wherein the upper cab back panel includes a first dimension in a first direction, the lower portion includes a second dimension in the first direction between the first indentation and the second indentation, the second dimension being less than the first dimension.

11. The vehicle of claim 10, further comprising:
a bed floor;
a first side panel;
a second side wall spaced from the first side panel by the bed floor, the lower portion includes a third dimension in the first direction, the third dimension extending between the first side panel and the second side panel, the third dimension being substantially equal to the first dimension.

12. The vehicle of claim 11 wherein the first side panel includes a first wheel well and the second side panel includes a second wheel well, the first indentation aligned with the first wheel well and the second indentation aligned with the second wheel well.

13. The vehicle of claim 12 wherein the second dimension extends between the first wheel well and the second wheel well.

* * * * *